Nov. 20, 1951  F. M. FRAGA  2,575,622
PICKUP IMPLEMENT
Filed Dec. 3, 1945  2 SHEETS—SHEET 1
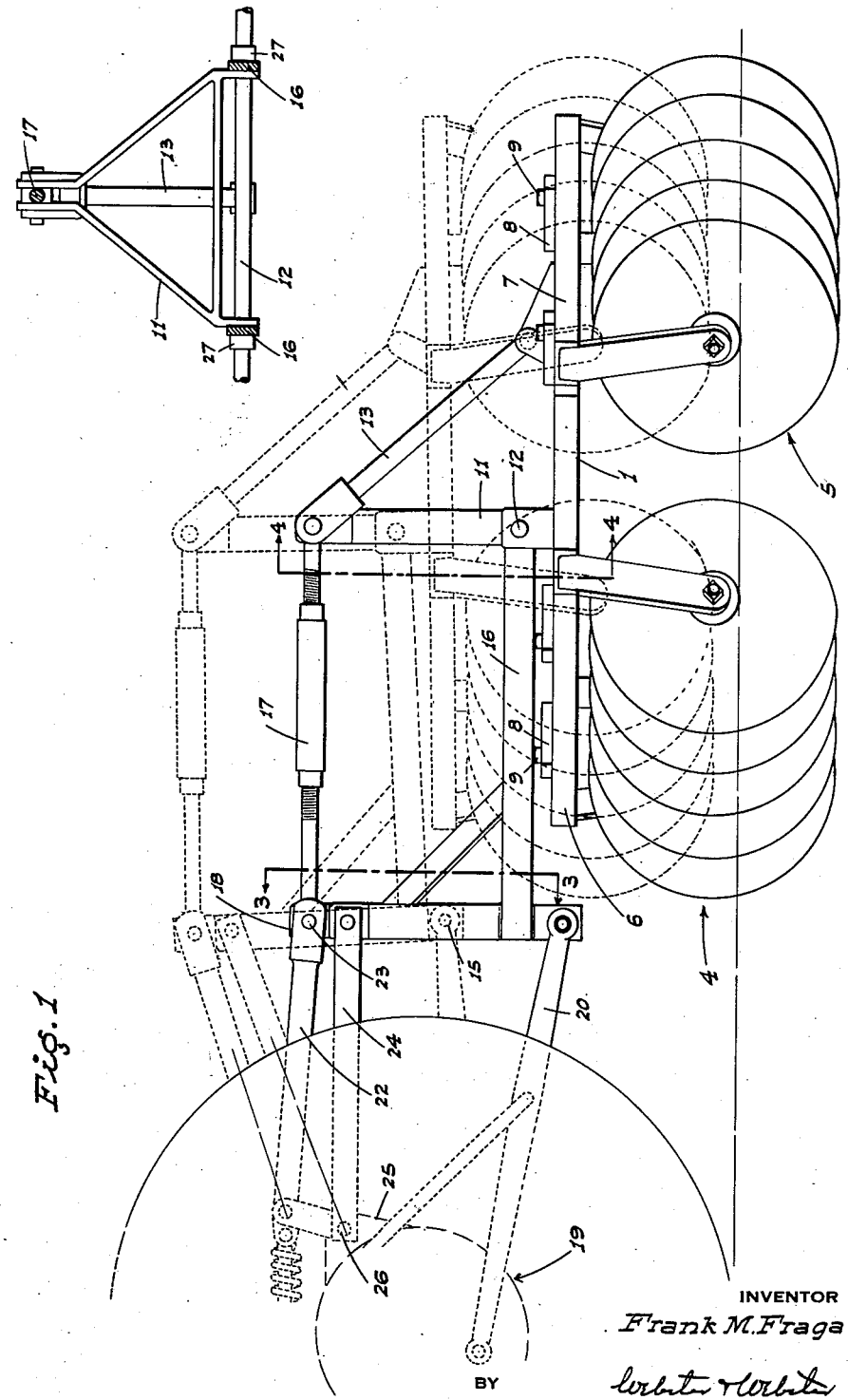
INVENTOR
Frank M. Fraga
BY Corbett & Corbett
ATTORNEYS Nov. 20, 1951     F. M. FRAGA     2,575,622
PICKUP IMPLEMENT
Filed Dec. 3, 1945     2 SHEETS—SHEET 2
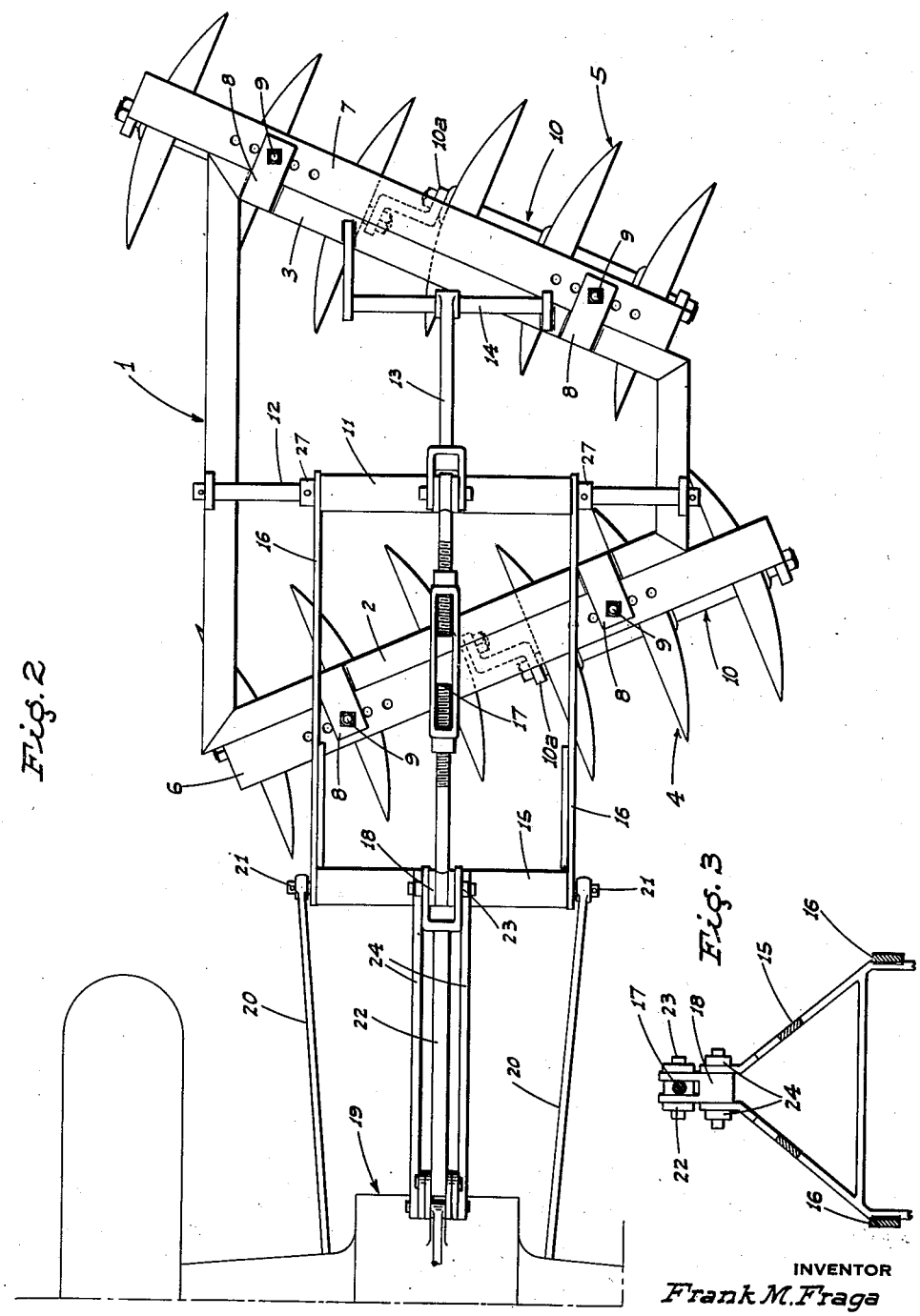
INVENTOR
*Frank M. Fraga*
BY
ATTORNEYS

UNITED STATES PATENT OFFICE 2,575,622

PICKUP IMPLEMENT

Frank M. Fraga, Fresno, Calif.

Application December 3, 1945, Serial No. 632,317

1 Claim. (Cl. 97—50)

This invention is directed to, and it is an object to provide, an improved agricultural implement of the "pick-up" type; i. e. an implement, such as a disc harrow, adapted to be connected in draft relation to the power lift of a tractor, whereby said power lift is operative to control the working depth of the implement, or to bodily lift the implement clear of the ground for turns in the field or for transport.

Another object of the invention is to provide the implement with a novel, adjustable lifting frame arranged for connection with the power lift of the tractor, and arranged so that a nicety of control of working depth may be accomplished, together with a relatively high lift of the implement when it is elevated above ground.

A further object of the invention is to provide an implement, of pick-up type, which is constructed—especially when a disc harrow or the like—so that the overall length of such implement is relatively short, which facilitates lifting by the power lift of the tractor.

It is also an object of the invention to provide an agricultural implement which includes a main frame, and novel means laterally adjustably mounting the soil working elements thereon.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views:

Figure 1 is a side elevation of the implement shown in full lines in working position, and in dotted lines in lifted position.

Figure 2 is a plan view of the implement.

Figure 3 is a cross section on line 3—3 of Fig. 1.

Figure 4 is a cross section on line 4—4 of Fig. 1.

Referring now more particularly to the characters of reference on the drawings, the invention is here shown as embodied in a disc harrow implement, wherein the numeral I indicates a horizontal, rigid main frame of generally triangular configuration in plan and including a front beam 2 and a rear beam 3, which beams converge laterally of the implement.

A front disc gang 4 is disposed mainly beneath and corresponds to the front beam, while a rear disc gang 5 is disposed mainly beneath and corresponds to the rear beam 3.

The disc gangs 4 and 5 include top beams, indicated at 6 and 7, respectively, disposed in symmetrical abutting relation against the front and rear beams 2 and 3 of the main frame 1.

The top beams 6 and 7 of the disc gangs are normally fixed, but relatively longitudinally adjustably secured, to the corresponding beams 2 and 3 of the main frame by means of attachment plates 8 secured to said beams 2 and 3 in overhanging relation to the top beams 6 and 7 of the disc gangs. The attachment plates 8 are adjustably connected to the top beams 6 and 7 by means of bolts 9 adapted to engage selectively in any one of a row of holes in said top beams adjacent each attachment plate.

In order to foreshorten the implement, and to thereby make it easier to lift the same, each disc gang includes a pair of individual disc gang sections 10 offset horizontally and axially of each other, as shown, with adjacent end spindles of said gang sections connected by offset brackets 10a. As the front and rear disc gangs 4 and 5 are diagonal in opposite directions, corresponding sections 10 of said gangs are offset in opposite directions lengthwise of the direction of travel, in the manner illustrated.

An upstanding, transversely extending A-frame 11, hereinafter referred to as the rear A-frame, is laterally adjustably secured at its lower end, on a transverse cross shaft 12 secured to the main frame intermediate the front and rear ends of the latter. The rear A-frame is maintained in normally rigid relation to the main frame by means of a rearwardly and downwardly inclined link 13, which connects between the upper end of said rear A-frame 11 and a right angle cross rod 14 secured in connection with the rear beam 3 of the main frame 1.

Ahead of the main frame 1, and in longitudinal alinement with the rear A-frame 11, is a front upstanding A-frame 15.

A pair of transversely spaced draft links 16 are disposed above the forward portion of the main frame 1 and pivotally connect at their rear ends to the rear A-frame 11 adjacent its lower end and rigidly connect to the front A-frame 15 likewise adjacent its lower end. A longitudinaly adjustable tie or turnbuckle link 17 is connected between the upper end of the rear A-frame 11 and a longitudinally swingable, upstanding clevis 18 pivotally mounted on and included in the front A-frame 15 at the top of the latter.

The above described implement is adapted to be connected in draft and lift relation with the power lift unit of a tractor, indicated generally at 19, and which includes power actuated lift links 20. When the implement is coupled to the tractor the power actuated lift links 20 are pivotally connected, as at 21, to the lower end of the front A-frame 15, below the draft links 16.

The power lift unit of the tractor also includes, in a central plane above the power actuated lift links 20, a longitudinally extending thrust arm 22 which is connected with mechanism (not shown) on the tractor which causes actuation of the links 20 upon predetermined longitudinal movement of said thrust arm 22. For example, when the thrust arm 22 is forced forwardly a predetermined distance the lift links 20 are power actuated in a raising direction. The thrust arm 22 is pivotally connected, at its rear end, to the clevis 18, as at 23.

Thus, when the drag of the implement becomes too great for the traction of the tractor, and which drag is reflected, by reaction through link 13, as forward thrust in the adjustable turnbuckle link 7, a corresponding thrust is imparted through the arm 22, with the result above described; i. e. the actuation in a raising direction of the lift links 20. This in turn raises the implement somewhat to relieve the aforesaid excess drag.

A transversely spaced pair of tension bars 24 are pivotally connected between the upper end of the front A-frame 15 independently of the clevis 18, and a fixed point on the tractor frame 25, as at 26. These tension bars maintain the front A-frame 15 in its upstanding position, and—in cooperation with the lift links 20—carry substantially all the weight of the implement so that the thrust arm 22, and the automatic lift control mechanism of the tractor to which said thrust arm is connected, are relieved of the strain which would otherwise be imposed thereon. In other words, the supporting frame and lift arrangement for the implement are so designed that, in any position of vertical adjustment of said implement, the weight of the latter cannot work against and adversely affect said automatic lift control mechanism, or effective operation of the links 13 and 17, and thrust arms 24 by means of which drag reaction of the implement actuates said mechanism.

By reason of the particular construction of the implement, including the foreshortening thereof by the offset disc sections, together with the particular A-frame and link assembly, the implement can be readily lift-controlled by the power lift unit of the tractor, with a nicety of adjustment for earth working, and to a relatively high point for turns or transport.

The adjustable assembly of the front beams 2 and 3 of the main frame, and the top beams 6 and 7 of the disc gangs, makes possible relative lateral adjustment of said disc gangs without in any way interfering with the lift mechanism of the implement. In addition, the entire main frame 1, together with the disc gangs as mounted thereon, is adjustable laterally of the direction of travel; such adjustment being accomplished through the medium of adjustable set collars 27 secured on the transverse cross shaft 12, the position of the rear A-frame 11 being determined by the setting of said collars. The lower end of the link 13 is slidable on the transverse cross rod 14 so as to move to a position corresponding to any position of adjustment of the rear A-frame 11.

From the foregoing description it will be readily seen that there has been produced such a device as substantially fulfills the objects of the invention, as set forth herein.

While this specification sets forth in detail the present and preferred construction of the device, still in practice such deviations from such details may be resorted to as do not form a departure from the spirit of the invention, as defined by the appended claim.

Having thus described the invention, the following is claimed as new and useful and upon which Letters Patent are desired:

An implement lifting hitch for a tractor which includes, at the rear, a transversely spaced pair of lift links and a longitudinally movable thrust arm operative to cause actuation of the links, such hitch comprising a rigid upstanding frame, means for pivoting the links to the lower end of such frame, a tension link adapted to be pivotally connected at one end to the tractor and at the other end to the frame above the links, a vertically disposed rigid member pivoted on the upstanding frame and comprising a relatively short clevis, the outer end of said thrust arm being pivoted to said clevis, an implement carrying frame mounted for vertical swinging movement relative to the upstanding frame and including another upright member rigid with said implement carrying frame, and a tie link pivoted at one end to the clevis and pivoted at the other end on said last named upright member whereby to effect swinging movement of such vertically disposed member, and consequent movement of the thrust arm, in response to vertical swinging movement of the implement frame.

FRANK M. FRAGA.

REFERENCES CITED

The following references are of record in the file of this patent:

UNITED STATES PATENTS

| Number | Name | Date |
|---|---|---|
| Re. 22,627 | McKay | Apr. 3, 1945 |
| 1,230,261 | Zelle | June 19, 1917 |
| 2,320,624 | Love | June 1, 1943 |
| 2,335,156 | McMahon | Nov. 23, 1943 |
| 2,336,848 | Cruse | Dec. 14, 1943 |
| 2,352,963 | McMahon | July 4, 1944 |
| 2,356,876 | Newkirk | Aug. 29, 1944 |
| 2,414,114 | Martin | Jan. 14, 1947 |
| 2,456,693 | Fraga | Dec. 21, 1948 |